(12) United States Patent
Sima et al.

(10) Patent No.: US 12,236,635 B1
(45) Date of Patent: Feb. 25, 2025

(54) DIGITAL PERSON TRAINING METHOD AND SYSTEM, AND DIGITAL PERSON DRIVING SYSTEM

(71) Applicant: NANJING SILICON INTELLIGENCE TECHNOLOGY CO., LTD., Nanjing (CN)

(72) Inventors: Huapeng Sima, Nanjing (CN); Hao Jiang, Nanjing (CN); Hongwei Fan, Nanjing (CN); Qixun Qu, Nanjing (CN); Jiabin Li, Nanjing (CN); Jintai Luan, Nanjing (CN)

( * ) Notice: Subject to any disclaimer, the term of this patent is extended or adjusted under 35 U.S.C. 154(b) by 0 days.

(21) Appl. No.: 18/809,315

(22) Filed: Aug. 19, 2024

(51) Int. Cl.
  *G06K 9/00* (2022.01)
  *G06T 5/50* (2006.01)
  *G06T 7/73* (2017.01)

(52) U.S. Cl.
  CPC ............. *G06T 7/73* (2017.01); *G06T 5/50* (2013.01); *G06T 2207/20132* (2013.01); *G06T 2207/20221* (2013.01); *G06T 2207/30196* (2013.01)

(58) Field of Classification Search
  CPC ... G06T 7/73; G06T 5/50; G06T 2207/20132; G06T 2207/20221; G06T 2207/30196
  See application file for complete search history.

(56) References Cited

U.S. PATENT DOCUMENTS

| | | | |
|---|---|---|---|
| 10,510,002 | B1 | 12/2019 | Olabiyi et al. |
| 11,521,373 | B1 | 12/2022 | Akbas et al. |
| 11,688,139 | B1 | 6/2023 | Karagoz et al. |
| 2022/0386942 | A1* | 12/2022 | Diaz-Arias ............ A61B 5/45 |

FOREIGN PATENT DOCUMENTS

| | | |
|---|---|---|
| CN | 111354043 A | 6/2020 |
| CN | 113158459 A | 7/2021 |
| CN | 115565203 A | 1/2023 |

(Continued)

OTHER PUBLICATIONS

Cao, D., Liu, W., Xing, W. et al. Human pose estimation based on feature enhancement and multi-scale feature fusion. SIViP 17, 643-650 (2023) (Year: 2023).*

(Continued)

*Primary Examiner* — Andrew M Moyer
(74) *Attorney, Agent, or Firm* — Schlee IP International, PC; Alexander R. Schlee; Pascal A. Schlee

(57) ABSTRACT

This application provides a digital person training method and system, and a digital person driving system. According to the method, human-body pose estimation data in training data is extracted, and the human-body pose estimation data is input into an optimized pose estimation network to obtain human-body pose optimization data. Generation losses of position optimization data and acceleration optimization data in the human-body pose optimization data are calculated based on a loss function of the optimized pose estimation network, so as to minimize errors between position estimation data and acceleration estimation data and a real value. In this way, the optimized pose estimation network is driven to update a network parameter to obtain an optimal driving model that is based on the optimized pose estimation network. The errors between the position estimation data and the acceleration estimation data and the real value are minimized.

8 Claims, 3 Drawing Sheets

(56) References Cited

FOREIGN PATENT DOCUMENTS

| WO | 2015006517 A2 | 1/2015 |
| WO | 2019098002 A1 | 5/2019 |
| WO | 2021132005 A1 | 7/2021 |

OTHER PUBLICATIONS

Guo, Jiamin, et al. "Obtaining lower-body Euler angle time series in an accurate way using depth camera relying on Optimized Kinect CNN." Measurement 188 (2022): 110461. (Year: 2022).*

* cited by examiner

DIGITAL PERSON TRAINING METHOD AND SYSTEM, AND DIGITAL PERSON DRIVING SYSTEM

FIELD OF THE INVENTION

This application claims priority to Chinese Patent Application No. 202311166705.6, entitled "DIGITAL PERSON TRAINING METHOD AND SYSTEM, AND DIGITAL PERSON DRIVING SYSTEM", filed with the China National Intellectual Property Administration (CNIPA) on Sep. 12, 2023, the entire disclosure of which is incorporated by reference in its entirety herein.

This application relates to the technical field of digital persons, and in particular, to a digital person training method and system, and a digital person driving system.

BACKGROUND OF THE INVENTION

During the process of training and driving a digital person, a motion video of a driving target may be collected by using an image collection device, and the digital person may be driven to carry out a same action according to an action carried out by a target in the motion video.

In the motion video, expression and pose information, body action information, gesture action information, and body position information of the target may be extracted, and spatial-temporal fusion may be performed on the foregoing information to obtain pose estimation information of the target. The pose estimation information may be a three-dimensional angle of rotation of a key point corresponding to a target body. Further, the digital person is driven to carry out the same action based on the pose estimation information.

However, when the digital person is driven based on the motion video, various parts of the target body in the motion video are blocked. Therefore, a plurality of parts of the target are not evenly distributed in a training sample, which easily leads to estimation deviations in positions of some key points. In addition, due to occlusion between different parts, jitter is easily caused during the training process. As a result, accuracy of a pose estimation result decreases.

SUMMARY OF THE INVENTION

This application provides a digital person training method and system, and a digital person driving system, to resolve a problem of decreased accuracy of a pose estimation result due to jitter during a digital person training process.

According to a first aspect, this application provides a digital person training method. The method includes:
  obtaining training data, and extracting human-body pose estimation data from the training data, where the training data is image data with a pose label, the image data includes a single sample person image, and pose actions of sample persons in different image data are different;
  inputting position estimation data, speed estimation data, and acceleration estimation data in the human-body pose estimation data into an optimized pose estimation network to obtain human-body pose optimization data;
  calculating generation losses of position optimization data and acceleration optimization data in the human-body pose optimization data based on a loss function of the optimized pose estimation network, to minimize errors between the position estimation data and the acceleration estimation data and a real value; and
  driving, based on the loss function, the optimized pose estimation network to update a network parameter to obtain an optimal driving model that is based on the optimized pose estimation network.

In some feasible embodiments, when obtaining the training data, the method further includes:
  obtaining an image proportion occupied by the sample person image in the training data; and
  if the image proportion is less than an image proportion threshold, cropping the sample person image to increase the image proportion of the sample person image.

In some feasible embodiments, the method further includes:
  calling a human-body key point definition model; and
  marking a human-body key point on the sample person image based on the human-body key point definition model.

In some feasible embodiments, when extracting the human-body pose estimation data, the method further includes:
  inputting the training data into a pose estimation network to obtain the human-body pose estimation data, wherein the pose estimation network a fully connected layers of a plurality of residual connections along a time axis; and the human-body pose estimation data is obtained by combining a current frame of training data with an estimation result of a previous frame of the current frame.

In some feasible embodiments, the method further includes:
  collecting a driving video, where a driving frame image of the driving video includes a single driving person image;
  marking a human-body key point on the single driving person image based on the human-body key point definition model;
  inputting the single driving person image marked with the human-body key point into the pose estimation network to obtain the human-body pose estimation data; and
  inputting the human-body pose estimation data into the optimal driving model to drive a digital person to carry out an action of a single driving person.

In some feasible embodiments, the optimized pose estimation network includes a first branch layer, a second branch layer, and a third branch layer; the first branch layer, the second branch layer, and the third branch layer are branch layers parallel to each other; the first branch layer is configured to calculate the position optimization data in the human-body pose optimization data; the second branch layer is configured to calculate speed optimization data in the human-body pose optimization data; the third branch layer is configured to calculate the acceleration optimization data in the human-body pose optimization data; and data output from the first branch layer, the second branch layer, and the third branch layer is respectively output by the fully connected layer and then enters a linear fusion layer for feature fusion, so as to obtain the human-body pose optimization data.

In some feasible embodiments, the inputting position estimation data, speed estimation data, and acceleration estimation data in the human-body pose estimation data into an optimized pose estimation network, to obtain human-body pose optimization data further includes:
  defining a training distribution, an imbalance training distribution, a balance test distribution, and a uniform distribution of the human-body pose estimation data, and label condition distributions respectively corresponding to the raining distribution, the imbalance training distribution, the balance test distribution, and the uniform distribution, and establishing association relationships;

estimating the label condition distribution corresponding to the uniform distribution to calculate a maximum likelihood loss of the label condition distribution corresponding to the training distribution; and obtaining a balanced mean square error loss function based on the maximum likelihood loss, to improve balance of a human-body pose estimation data sample.

In some feasible embodiments, the calculating generation losses of position optimization data and acceleration optimization data in the human-body pose optimization data based on a loss function of the optimized pose estimation network includes:

establishing a position optimization target value based on a real value corresponding to the position estimation data and the position estimation data;

establishing an acceleration optimization target value based on a real value corresponding to the acceleration estimation data and the acceleration estimation data; and combining the position optimization target value with the acceleration optimization target value to obtain a target value of the loss function of the optimized pose estimation network, so as to establish the loss function of the optimized pose estimation network.

According to a second aspect, this application provides a digital person training system, including a preprocessing module, a training module, and a control module, wherein the preprocessing module is configured to obtain training data, and extract human-body pose estimation data from the training data, where the training data is image data, the image data includes a single sample person image, and pose actions of sample persons in different image data are different;

the training module is configured to input position estimation data, speed estimation data, and acceleration estimation data in the human-body pose estimation data into an optimized pose estimation network to obtain human-body pose optimization data;

the control module is configured to calculate loss functions of position optimization data and acceleration optimization data in the human-body pose optimization data; and the control module is further configured to drive, based on the loss function, the optimized pose estimation network to update a network parameter, to obtain an optimal driving model that is based on the optimized pose estimation network.

According to a third aspect, this application provides a digital person driving system, including a server that can communicate with a user equipment, where the server includes an optimal driving model trained by using the method in the foregoing method embodiments; and the server is configured to:

receive a driving video sent by the user equipment, wherein a driving frame image of the driving video includes a single driving person image;

mark a human-body key point on the single driving person image based on a human-body key point definition model;

input the single driving person image marked with the human-body key point into a pose estimation network to obtain human-body pose estimation data;

input the human-body pose estimation data into an optimal driving model to obtain human-body pose optimization data;

send the human-body pose optimization data back to the user equipment, to drive a digital person in the user equipment to carry out an action of a single driving person; or drive, based on the human-body pose optimization data, a digital person in the server to carry out an action of the single driving person, and send data of the digital person in the server back to the user equipment to be displayed in the user equipment.

It may be learned from the foregoing technical content that this application provides a digital person training method and system, and a digital person driving system. According to the method, the human-body pose estimation data in the training data is extracted, and the human-body pose estimation data is input into the optimized pose estimation network to obtain the human-body pose optimization data. The generation losses of the position optimization data and the acceleration optimization data in the human-body pose optimization data are calculated based on the loss function of the optimized pose estimation network, so as to minimize the errors between the position estimation data and the acceleration estimation data and the real value. In this way, the optimized pose estimation network is driven to update the network parameter to obtain the optimal driving model that is based on the optimized pose estimation network. The errors between the position estimation data and the acceleration estimation data and the real value are minimized, so that jitter caused by occlusion of various body parts in a sample task in the training data is reduced, thereby improving accuracy of recognizing human pose data.

BRIEF DESCRIPTION OF THE DRAWINGS

To more clearly describe the technical solutions of this application, the accompanying drawings to be used in the embodiments are briefly illustrated below. Obviously, persons of ordinary skills in the art can also derive other accompanying drawings according to these accompanying drawings without an effective effort.

DETAILED DESCRIPTION OF THE EMBODIMENTS

Embodiments are described below in detail, and examples thereof are shown in the accompanying drawings. When the descriptions below relate to the accompanying drawings, unless otherwise stated, same numbers in different accompanying drawings indicate same or similar elements. Implementations described in the following embodiments do not represent all implementations consistent with this application. Merely, examples of a system and a method that are described in detail in the claims and in accordance with some aspects of this application are provided.

A digital person may imitate the behaviors of a person to carry out corresponding actions. In a monocular visual recognition scenario, a digital person model may be trained by using sample data containing body movements of the person. During application, the digital person model is driven by the body movements and expressions of the person to output the digital person. The output digital person carries out the same body movements and expressions as the person.

In a process of training the digital person model, sample persons that carry out different actions need to be used as training samples as possible, so as to enrich samples and improve training effects of the digital person model. However, in some embodiments, the samples in the training samples are unbalanced, and types of actions carried out by the sample persons are relatively less, which affects training effects of the digital person model.

In addition, when training the digital person model, human-body key points of the sample person need to be collected to better recognize positions of various body parts of the sample person when the body parts are carrying out different actions. However, in the training samples, when the sample persons carry out different actions, there is occlusion between the body parts, which reduces accuracy in recognizing the human-body key point. As a result, there is jitter in a human-body pose estimation result, resulting in poor model training effects.

Figure 1:
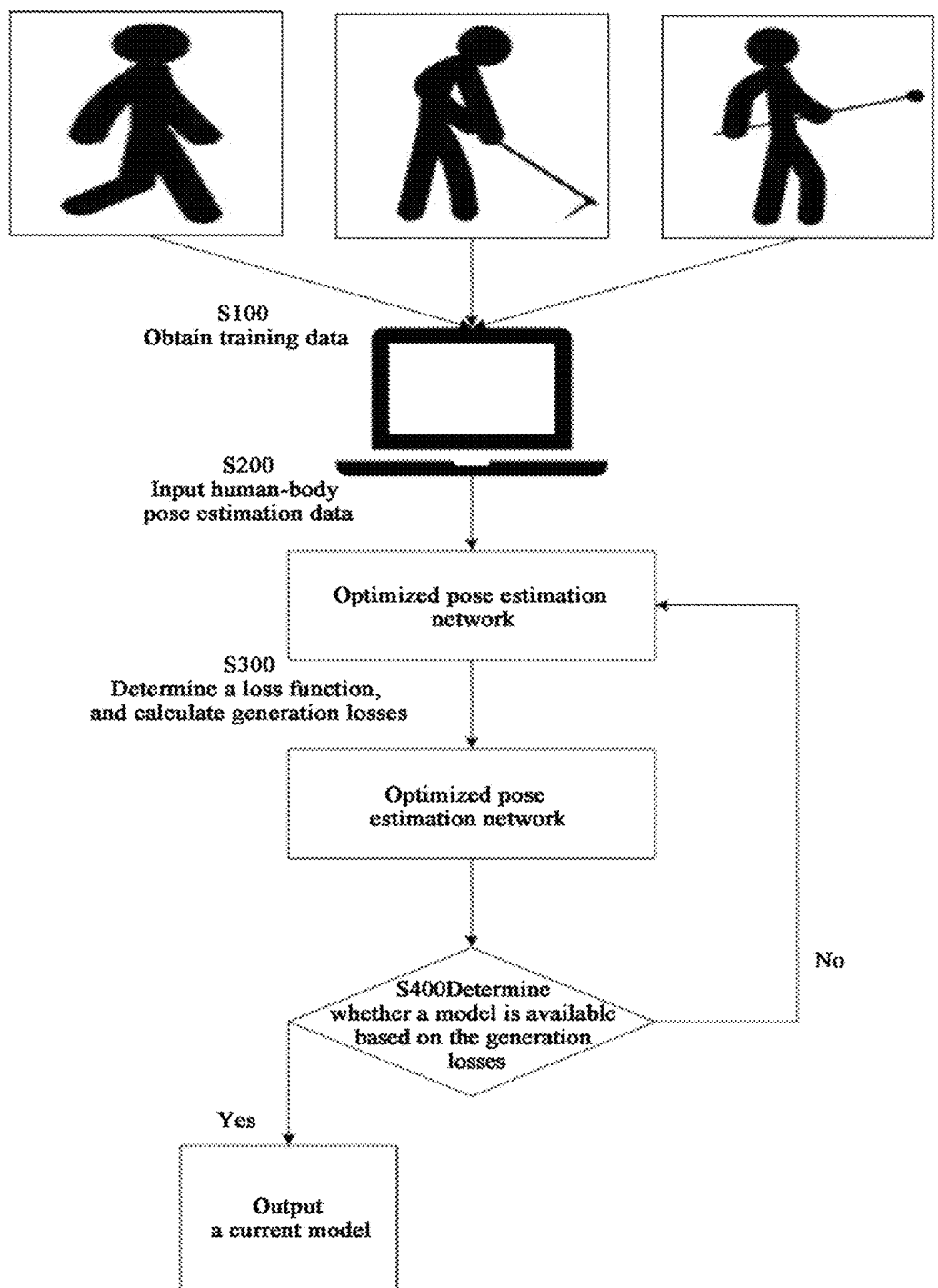
FIG. 1 is a schematic flowchart of a digital person training method according to an embodiment of this application.

Based on the foregoing problem, as shown in FIG. 1, this application provides a digital person training method. The method includes the following steps.

S100. Obtain training data, and extract human-body pose estimation data from the training data.

The training data is image data with a pose label. The image data includes a single sample person image. Pose actions of sample persons in different image data are different. Sample richness may be improved by the sample persons that carries out multiple actions, so as to improve accuracy of model training.

In some embodiments, extracting the human-body pose estimation data includes extracting a human-body key point and a three-dimensional rotational Euler angle corresponding to the human-body key point from the training data. There may be a positional error when the human-body key point is defined based on the training data. The positional error is a three-dimensional vector, and combination of three-dimensional errors of the three-dimensional vector may be represented by using an angular error. In other words, the three-dimensional rotational Euler angle may have an error with the positional error.

To facilitate training of a digital person model, the training data may be two-dimensional color RGB image data, of which resolution is not less than 512 pixels*512 pixels, so as to ensure quality of the image data. The training data may be a collection of multiple pieces of single image data, or may be obtained through frame extraction in a segment of video. A larger proportion of the sample person in the image data is more conducive to providing a training feature for model training. Therefore, the training data may also be preprocessed based on a proportion of the sample person in the image data.

To be specific, when obtaining the training data, the method further includes:
obtaining an image proportion occupied by the sample person image in the training data; and
if the image proportion is less than an image proportion threshold, cropping the sample person image to increase the image proportion of the sample person image.

In some embodiments, the image proportion occupied by the sample person image may be calculated in the training data by calculating a quantity of pixels occupied by the sample person image and a quantity of pixels in the image data. To improve effects of the training data for providing the training feature, the image proportion threshold may be set to filter the data. When the image proportion of the sample person image is less than the image proportion threshold, the image data except the sample person may be cropped, so that an image proportion of the sample person is greater than the image proportion threshold, thereby better providing the training feature.

Figure 2:
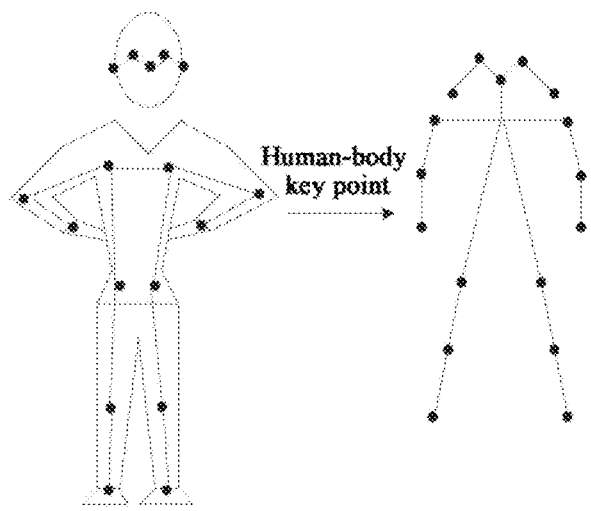
FIG. 2 is a schematic diagram of marking a human-body key point according to an embodiment of this application.

On the basis that the image proportion of the sample person meets the image proportion threshold, as shown in FIG. 2, the human-body key point may be defined in combination with a human-body key point definition model. To be specific, when defining the human-body key point, the method further includes:
calling a human-body key point definition model; and
marking the human-body key point on the sample person image based on the human-body key point definition model.

The human-body key point definition model may be an existing model, such as an SMPL model (skinned multi-person linear model). In some embodiments, the human-body key point definition model may also be a customized key point definition model, to adapt to various application scenarios. Using the SMPL model as an example, 22 human-body key points may be defined on the sample person image of the training data. The human-body key points include: a pelvis, a left hip, a right hip, a first spine, a left knee, a right knee, a second spine, a left ankle, a right ankle, a third spine, a left toe, a right toe, a neck, a left clavicle, a right clavicle, jaw, a left shoulder, a right shoulder, a left elbow, a right elbow, a left wrist, and a right wrist.

A coordinate system may be established based on the foregoing human-body key points, so that the human-body key points include a human-body key point coordinate. When the training data is continuous, by calculating coordinate changes of the human-body key point, a speed, an acceleration, and other motion features of the human-body key point may also be calculated. This helps optimizing a positional error and an angular error based on the human-body key point coordinate.

The positional error and the angular error may cause long-term jitter during attitude estimation, resulting in fluctuations in error values within a certain range, which are difficult to eliminate through ordinary filtering manners. Therefore, it is needed to optimize the positional error and an error in the three-dimensional rotational Euler angle to reduce long-term jitter caused by inaccurate estimations for the positional error and the error in the three-dimensional rotational Euler angle.

Before the positional error and the error in the three-dimensional rotational Euler angle are optimized, the human-body pose estimation data of the sample person may be obtained based on the training data including the human-body key point coordinate. When extracting the human-body pose estimation data, the method does not include inputting the training data into a pose estimation network to obtain the human-body pose estimation data. The pose estimation network includes a fully connected layers of a plurality of residual connections along a time axis. The human-body pose estimation data is obtained by combining a current frame of training data with an estimation result of a previous frame of the current frame.

Figure 3:
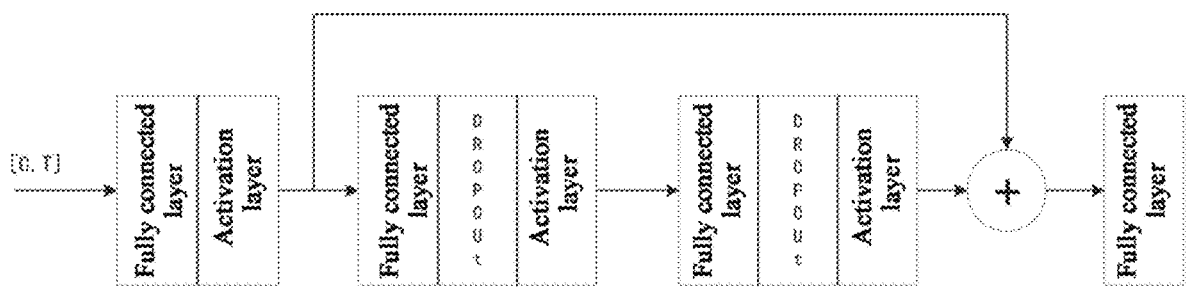
FIG. 3 is a schematic diagram of a basic pose estimation network according to an embodiment of this application.

As shown in FIG. 3, the pose estimation network is a basic smoothing network model that may be configured to obtain, based on the human-body key point, the human-body pose estimation data including a basic estimated value for the three-dimensional rotational Euler angle, for subsequent optimization. The human-body pose estimation data includes the estimated value for the three-dimensional rotational Euler angle, which is determined by estimated values for position data, speed data, and acceleration data of the human-body key point. The estimated value may be used for subsequent optimization to obtain, based on the estimated value, an optimized value of which impact of the jitter is reduced.

S200. Input position estimation data, speed estimation data, and acceleration estimation data in the human-body pose estimation data into an optimized pose estimation network to obtain human-body pose optimization data.

Figure 4:
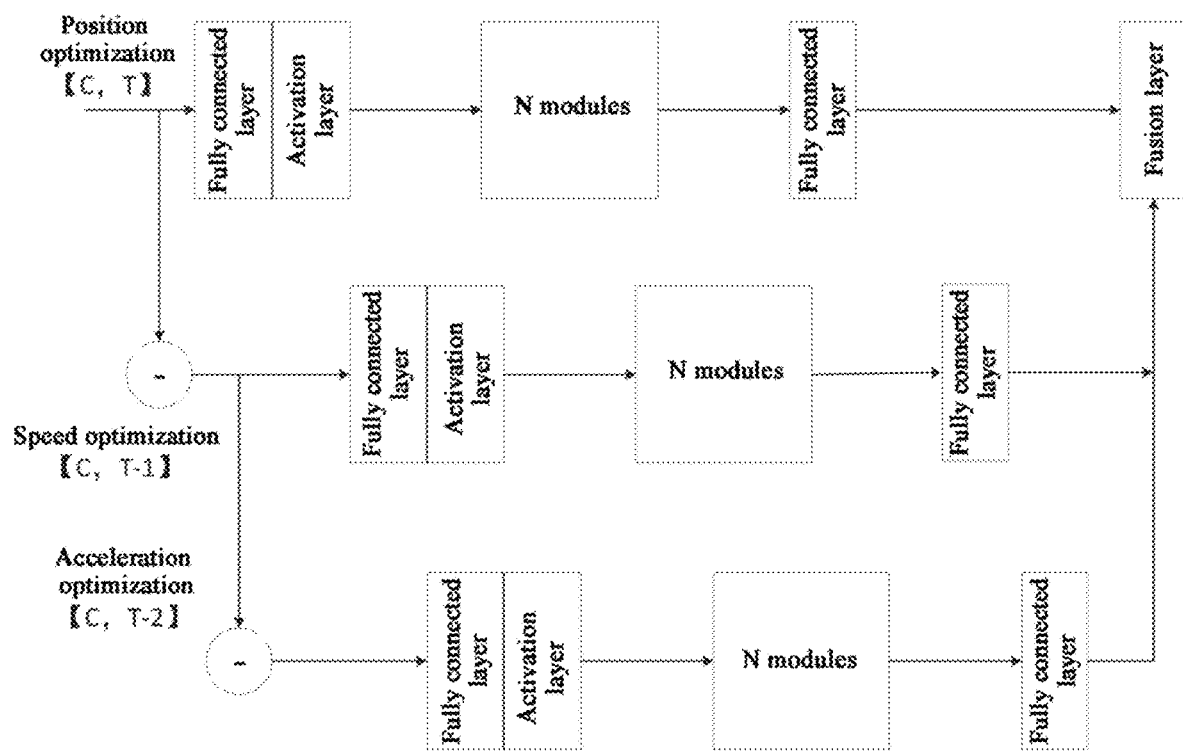
FIG. 4 is a schematic diagram of an optimized pose estimation network according to an embodiment of this application.

As shown in FIG. 4, in some embodiments, the optimized pose estimation network includes a first branch layer, a second branch layer, and a third branch layer. The first branch layer, the second branch layer, and the third branch layer are branch layers parallel to each other. The first branch layer is configured to calculate the position optimization data in the human-body pose optimization data. The second branch layer is configured to calculate speed optimization data in the human-body pose optimization data. The third branch layer is configured to calculate acceleration optimization data in the human-body pose optimization data. Data output from the first branch layer, the second branch layer, and the third branch layer is respectively output by the fully connected layer and then enters a linear fusion layer for feature fusion, so as to obtain the human-body pose optimization data.

The optimized pose estimation network is a motion optimization smoothing network, and a top layer of the optimization network serves as a basic branch for improving position information. Based on an action superposition principle, the optimization network also provides two branches for improving speed information and acceleration information, respectively. The position estimation data, the speed estimation data, and the acceleration estimation data may form a three-dimensional vector of the human-body key point, and jointly determine the estimated value for the three-dimensional rotational Euler angle. Therefore, the three-dimensional rotational Euler angle may be optimized based on optimization for the position estimation data, the speed estimation data, and the acceleration estimation data, to reduce the impact of the long-term jitter.

Estimated values in three dimensions correspond to three branches of the optimized pose estimation network. Inputting the human-body pose estimation data into the optimized pose estimation network may be expressed by the following formula:

$$\hat{G}=g(\hat{Y}).$$

It is satisfied that $\hat{G} \in R^{L \times C}$, where $\hat{G}$ represents an optimized and improved human-body pose estimation result, R represents the three-dimensional rotational Euler angle of the human-body key point, and L represents a quantity of input image frames. It is satisfied that C=N×D, wherein N represents a quantity of defined human-body key points, and D represents a quantity of output dimensions. In a three-dimensional human-body pose estimation issue, D=3, and $\hat{Y}$ represents an estimated value for a key-point Euler angle that is output by calculating a human-body pose estimation algorithm based on a basic smoothing network.

Output of each layer of the optimized pose estimation network to which the human-body pose estimation data is input may be calculated by the following formula:

$$\hat{Y}_{i,t}^{l+1} = \sigma\left(\sum_{t=0}^{T}\omega_\tau^l * \hat{Y}_{i,t}^l + b^l\right);$$

wherein l represents a first layer of the network. σ represents a non-linear activation function, which may be a Leakey-ReLU activation function, and may also be adjusted according to expected training effects. $\omega_t^l$ and $b^l$ represent weight and bias learned at a $t^{th}$ frame, respectively; and are not shared between different $i^{th}$ axes. In addition, if a sliding window T is set by means of a sliding window, a pose estimation value of the current frame may be updated in a real-time manner based on the current frame in combination with calculation results of T−1 frames.

From a physical perspective, the speed estimation data and the acceleration estimation data respectively are first-order motion information and second-order motion information of the position estimation data, which may be used for improving a convergence speed of the optimized pose estimation network, so as to improve model training efficiency. Based on the input $\hat{Y}$, a speed and acceleration of each axis in a channel C may be calculated according to speed and acceleration formulas:

$$\hat{V}_{i,t}=\hat{Y}_{i,t}-\hat{Y}_{i,t-1}, \ldots, \hat{A}_{i,t}=\hat{V}_{i,t}-\hat{V}_{i,t-1};$$

wherein the speed and the acceleration are both instantaneous values corresponding to a certain frame. To obtain long-term time information, the speed and acceleration formulas may be used to improve the speed and the acceleration. Moreover, a linear fusion layer is implemented at top portions of the three branches of the optimized pose estimation network, so that a final pose estimation result is obtained by aggregating information of different motion orders.

S300. Calculate generation losses of position optimization data and acceleration optimization data in the human-body pose optimization data based on a loss function of the optimized pose estimation network, to minimize errors between the position estimation data and the acceleration estimation data and a real value.

In some embodiments, estimation accuracy of the three-dimensional rotational Euler angle is improved by optimizing the position data and the acceleration data. Calculating the generation losses of the position optimization data and the acceleration optimization data in the human-body pose optimization data based on the loss function of the optimized pose estimation network includes:
  establishing a position optimization target value based on the position estimation data and a real value corresponding to the position estimation data;
  establishing an acceleration optimization target value based on the acceleration estimation data and a real value corresponding to the acceleration estimation data; and
  combining the position optimization target value with the acceleration optimization target value, to obtain a target value of the loss function of the optimized pose estimation network, so as to establish the loss function of the optimized pose estimation network.

In the embodiments, the following loss functions may be used to optimize the position data and the acceleration data, respectively:

$$L_{pose} = \frac{1}{T \times C} \sum_{t=0}^{T} \sum_{i=0}^{C} |\hat{G}_{i,t} - Y_i|;$$

and $$L_{ace} = \frac{1}{(T-2) \times C} \sum_{t=0}^{T} \sum_{i=0}^{C} |\hat{G}''_{i,t} - A_{i,t}|.$$

$\hat{G}_{i,t}''$ represents acceleration calculated based on a predicted pose $\hat{G}_{i,z}$, and $A_{i,t}$ represents a real value of the acceleration. $L_{pose}$ represents a loss function of the position data, and $L_{ace}$ represents a loss function of the acceleration data. Constructing the loss functions respectively based on the position data and the acceleration data may optimize the position data and the acceleration data, so that long-term jitter caused by occlusion of various body parts of the sample person in the training data may be reduced. It may be understood that during each training, the generation loss may be calculated according to the loss function, so as to determine the training effects of the current model. S400. Drive, based on the loss function, the optimized pose estimation network to update a network parameter to obtain an optimal driving model that is based on the optimized pose estimation network. $L_{pose}$ and $L_{ace}$ are combined to serve as a target value for the optimized pose estimation network to learn. When the generation loss calculated based on the loss function does not reach the target value, the training parameter of the optimized pose estimation network may be adjusted for iterative training to obtain an optimal training model.

It should be noted that frequency at which the human-body key points appear in the training sample differs, which may easily lead to unbalanced samples and result in poor model training effects. Therefore, it is needed to establish the loss function for balancing samples, to optimize balance of the samples and improve the model training effects. In some embodiments, a training method for balancing samples further includes:

defining a training distribution, an imbalance training distribution, a balance test distribution, and a uniform distribution of the human-body pose estimation data, and label condition distributions respectively corresponding to the raining distribution, the imbalance training distribution, the balance test distribution, and the uniform distribution, and establishing association relationships;

estimating the label condition distribution corresponding to the uniform distribution to calculate a maximum likelihood loss of the label condition distribution corresponding to the training distribution; and obtaining a balanced mean square error loss function based on the maximum likelihood loss, to improve balance of a human-body pose estimation data sample.

In the sample balancing process, distribution data may be pre-defined. For example, it is defined that $p_{train}(x, y)$ is the training distribution, $p_{train}(y)$ is the imbalance training distribution, $p_{bal}(x, y)$ is the balance test distribution, and $p_{bal}(y)$ is the uniform distribution. $p_{train}(x, y)$ and $p_{bal}(x, y)$ have a same label condition distribution $p(x|y)$. Relationships between $p_{train}(y|x)$, $p_{bal}(y|x)$, and $p_{train}(y)$ may be expressed by the following distribution data relationship formula:

$$p_{train}(y \mid x) = \frac{p_{bal}(y \mid x) \cdot p_{train}(y)}{\int_Y p_{bal}(y' \mid x) \cdot p_{train}(y')dy'}.$$

As shown in the distribution data relationship formula, $p_{bal}(y|x)$ may be estimated by minimizing an NLL (negative log-likelihood) loss of $p_{train}(y|x)$. Moreover, expected $p_{bal}(y|x)$ is directly estimated according to the following expected expression formula by using a regressor:

$$p_{bal}(y|x;\theta) = N(y; y_{pred}, \sigma_{noise}^2 I).$$

During a model training process, $p_{bal}(y|x; \theta)$ may be predicted according to the distribution data relationship formula and the expected expression formula. In other words, the estimated value for the three-dimensional rotational Euler angle of the human-body key point is predicted under a condition of annotating the human-body key point by using a current training set. Moreover, $p_{bal}(y|x; \theta)$ is converted into $p_{train}(y|x; \theta)$ according to the distribution data relationship formula, so as to update $\theta$ by calculating the maximum likelihood loss. During a model inference process, a predicted value $p_{bal}(y|x; \theta)$ is directly output by the regressor. A maximum likelihood loss function of a conditional probability after the conversion is the balanced mean square error loss function for sample balancing. Based on the predicted value $y_{pred}$ of the regressor and a training label distribution $p_{train}(y)$, the balanced mean square error loss may be expressed according to a formula for the balanced mean square error loss function as:

$$L_{bal} = -\log p_{train}(y \mid x; \theta) = -\log \frac{p_{bal}(y \mid x; \theta) \cdot p_{train}(y)}{\int_Y p_{bal}(y' \mid x; \theta) \cdot p_{train}(y')dy'};$$

$$\cong -\log N(y; y_{pred}, \sigma_{noise}^2 I) + \log \int N(y'; y_{pred}, \sigma_{noise}^2 I) \cdot p_{train}(y')dy'$$

A constant term $-\log p_{train}(y)$ is hidden by $\cong$. The balanced mean square error loss consists of two parts, wherein a first part is same as a standard mean square error loss, and a second part is a balance term that requires an integral operation. When the training label distribution $p_{train}$ is a uniform distribution, a new balance term is a constant. Therefore, the standard mean square error loss may be considered as a special case of the balanced mean square error loss.

As shown in the balanced mean square error loss function, a mean square error balancing method may be used to eliminate mismatch sample distribution between a training set and a test set, so as to alleviate a problem of unbalanced training samples caused by low frequency at which some of the human-body key points appear, which affects accuracy of the model.

The model iterated according to a position loss function, an acceleration loss function, and the balanced mean square error loss function may be applied to generate, based on the driving person, the digital person who carries out same actions as the driving person. In some embodiments, the method further includes:

collecting a driving video, wherein a driving frame image of the driving video includes a single driving person image;

marking a human-body key point on the single driving person image based on the human-body key point definition model;

inputting the single driving person image marked with the human-body key point into the pose estimation network to obtain the human-body pose estimation data; and inputting the human-body pose estimation data into the optimal driving model to drive a digital person to carry out an action of a single driving person.

In some embodiments, the actions of the driving person may be continuously collected by using a camera. Video resolution of the camera is 720 P, and a frame rate thereof is 30 frames/second. After a driving video is collected, key points are marked for the driving person in the image data obtained through frame extraction. The image data with the marked key points is input into the pose estimation network of the trained model to obtain the human-body pose estimation data. The human-body pose estimation data is further input into the optimized pose estimation network of the trained model to eliminate jitter, and the digital person is output by the trained model. The digital person may carry out same actions as the driving person.

In some embodiments, this application provides a digital person training system, including a preprocessing module, a training module, and a control module.

The preprocessing module is configured to obtain training data, and extract human-body pose estimation data from the training data. The training data is image data. The image data includes a single sample person image. Pose actions of sample persons in different image data are different.

The training module is configured to input position estimation data, speed estimation data, and acceleration estimation data in the human-body pose estimation data into an optimized pose estimation network to obtain human-body pose optimization data.

The control module is configured to calculate loss functions of position optimization data and acceleration optimization data in the human-body pose optimization data.

The control module is further configured to drive, based on the loss function, the optimized pose estimation network to update a network parameter to obtain an optimal driving model that is based on the optimized pose estimation network.

In some embodiments, this application provides a digital person driving system, including a server that can communicate with a user equipment. The server includes an optimal driving model trained by using the method in the method embodiments. The server is configured to:

receive a driving video sent by the user equipment, wherein a driving frame image of the driving video includes a single driving person image;

mark a human-body key point on the single driving person image based on a human-body key point definition model;

input the single driving person image marked with the human-body key point into a pose estimation network to obtain human-body pose estimation data;

input the human-body pose estimation data into an optimal driving model to obtain human-body pose optimization data;

send the human-body pose optimization data back to the user equipment to drive a digital person in the user equipment to carry out an action of a single driving person; or drive, based on the human-body pose optimization data, a digital person in the server to carry out an action of the single driving person, and send data of the digital person in the server back to the user equipment to be displayed in the user equipment.

It may be learned from the foregoing technical content that this application provides a digital person training method and system, and a digital person driving system. According to the method, the human-body pose estimation data in the training data is extracted, and the human-body pose estimation data is input into the optimized pose estimation network to obtain the human-body pose optimization data. The generation losses of the position optimization data and the acceleration optimization data in the human-body pose optimization data are calculated based on the loss function of the optimized pose estimation network, so as to minimize the errors between the position estimation data and the acceleration estimation data and the real value. In this way, the optimized pose estimation network is driven to update the network parameter to obtain the optimal driving model that is based on the optimized pose estimation network. The errors between the position estimation data and the acceleration estimation data and the real value are minimized, so that jitter caused by occlusion of various body parts in a sample task in the training data is reduced, thereby improving accuracy of recognizing human pose data.

For similar parts between the embodiments provided in this application, reference may be made to each other. The specific implementations described above are merely some examples under a general concept of this application, and do not constitute any limitation to the protection scope of this application. For a person skilled in the art, any other implementations derived according to the solutions of this application without an effective effort all fall within the protection scope of this application.

What is claimed is:

1. A digital person training method, comprising:

obtaining training data, and extracting human-body pose estimation data from the training data, wherein the training data is image data with a pose label, the image data comprises a single sample person image, and pose actions of sample persons in different image data are different;

inputting position estimation data, speed estimation data, and acceleration estimation data in the human-body pose estimation data into an optimized pose estimation network to obtain human-body pose optimization data, wherein sample balancing processing is performed on the human-body pose estimation data when the human-body pose estimation data is input into the optimized pose estimation network; the optimized pose estimation network comprises a first branch layer, a second branch layer, and a third branch layer; the first branch layer, the second branch layer, and the third branch layer are branch layers parallel to each other; the first branch layer is configured to calculate position optimization data in the human-body pose optimization data; the second branch layer is configured to calculate speed optimization data in the human-body pose optimization data; the third branch layer is configured to calculate acceleration optimization data in the human-body pose optimization data; data output from the first branch layer, the second branch layer, and the third branch layer is respectively output by the fully connected layer and then enters a linear fusion layer for feature fusion, so as to obtain the human-body pose optimization data; and inputting the human-body pose estimation data into the optimized pose estimation network is expressed by the following formula:

$$\hat{G}=g(\hat{Y}),$$

wherein it is satisfied that $\hat{G} \in R^{L \times C}$, wherein $\hat{G}$ represents an optimized and improved human-body pose estimation result, R represents a three-dimensional rotational Euler angle of a human-body key point, and L represents a quantity of input image frames; and it is satisfied that C=N×D, wherein N represents a quantity of defined human-body key points, D represents a quantity of output dimensions, in a three-dimensional human-body pose estimation issue, D=3, and $\hat{Y}$ represents an estimated value for a key-point Euler angle that is output by calculating a human-body pose estimation algorithm based on a basic smoothing network, wherein output of the branch layer of the optimized pose estimation network is expressed by the following formula:

$$\hat{Y}_{i,t}^{l+1} = \sigma\left(\sum_{t=0}^{T} \omega_\tau^l * \hat{Y}_{i,t}^l + b^l\right),$$

wherein l represents a first layer of the network; σ represents a non-linear activation function; $\omega_r^l$ and $b^l$ represent weight and bias learned at a $t^{th}$ frame, respectively; and T represents a sliding window,
wherein the step of performing balancing processing on the human-body pose estimation data comprises:
defining $p_{train}(x,y)$ as training distribution, wherein $p_{train}(y)$ represents a non-equilibrium training distribution, $p_{bal}(x, y)$ represents a balance test distribution, $p_{bal}(y)$ represents a uniform distribution, and relationships between $p_{train}(y|x)$, $p_{bal}(y|X)$, and $p_{train}(y)$ can be expressed by the following distribution data relationship formula:

$$p_{train}(y \mid x) = \frac{p_{bal}(y \mid x) \cdot p_{train}(y)}{\int_Y p_{bal}(y' \mid x) \cdot p_{train}(y')dy'};$$

predicting an estimated value for the three-dimensional rotational Euler angle of the human-body key point according to an expected expression formula, wherein the expected expression formula is:

$$p_{bal}(y|x;\theta)=N(y;y_{pred},\sigma_{noise}^2 I),$$

wherein θ represents a parameter of the optimized pose estimation network for training, $y_{pred}$ represents the estimated value for the three-dimensional rotational Euler angle of the human-body key point, and $\sigma_{noise}^2 I$ represents a variance matrix of a Gaussian distribution to which the estimated value for the three-dimensional rotational Euler angle conforms;
calculating an equilibrium mean square error loss based on the distribution data relationship formula and an equilibrium mean square error loss formula, wherein the equilibrium mean square error loss is used for balancing the human-body pose estimation data, the equilibrium mean square error loss is determined by a maximum likelihood loss of a corresponding conditional probability after $p_{bal}(y|x; \theta)$ is converted into $p_{train}(y|x; \theta)$, and the equilibrium mean square error loss formula is:

$$L_{bal} = -\log p_{train}(y \mid x; \theta) = -\log \frac{p_{bal}(y \mid x; \theta) \cdot p_{train}(y)}{\int_Y p_{bal}(y' \mid x; \theta) \cdot p_{train}(y')dy'} \cong$$

$$-\log N(y; y_{pred}, \sigma_{noise}^2 I) + \log \int_Y N(y'; y_{pred}, \sigma_{noise}^2 I) \cdot p_{train}(y')dy'$$

calculating generation losses of the position optimization data and the acceleration optimization data in the human-body pose optimization data based on a loss function of the optimized pose estimation network, to minimize errors between the position estimation data and the acceleration estimation data and a real value; and
driving, based on the loss function, the optimized pose estimation network to update a network parameter to obtain an optimal driving model that is based on the optimized pose estimation network.

2. The digital person training method according to claim 1, wherein when obtaining the training data, the method further comprises:
obtaining an image proportion occupied by the sample person image in the training data; and
if the image proportion is less than an image proportion threshold, cropping the sample person image to increase the image proportion of the sample person image.

3. The digital person training method according to claim 2, further comprises:
calling a human-body key point definition model; and
marking a human-body key point on the sample person image based on the human-body key point definition model.

4. The digital person training method according to claim 3, wherein when extracting the human-body pose estimation data, the method comprises:
inputting the training data into a pose estimation network to obtain the human-body pose estimation data, wherein the pose estimation network comprises a fully connected layers of a plurality of residual connections along a time axis; and the human-body pose estimation data is obtained by combining a current frame of training data with an estimation result of a previous frame of the current frame.

5. The digital person training method according to claim 4, further comprises:
collecting a driving video, wherein a driving frame image of the driving video comprises a single driving person image;
marking a human-body key point on the single driving person image based on the human-body key point definition model;
inputting the single driving person image marked with the human-body key point into the pose estimation network to obtain the human-body pose estimation data; and
inputting the human-body pose estimation data into the optimal driving model to drive a digital person to carry out an action of a single driving person.

6. The digital person training method according to claim 1, wherein the calculating generation losses of the position optimization data and the acceleration optimization data in the human-body pose optimization data based on a loss function of the optimized pose estimation network comprises:
  establishing a position optimization target value based on a real value corresponding to the position estimation data and the position estimation data;
  establishing an acceleration optimization target value based on a real value corresponding to the acceleration estimation data and the acceleration estimation data; and
  combining the position optimization target value with the acceleration optimization target value to obtain a target value of the loss function of the optimized pose estimation network, so as to establish the loss function of the optimized pose estimation network.

7. A digital person training system, comprising a preprocessing module, a training module, and a control module, wherein
  the preprocessing module is configured to obtain training data, and extract human-body pose estimation data from the training data, wherein the training data is image data, the image data comprises a single sample person image, and pose actions of sample persons in different image data are different;
  the training module is configured to input position estimation data, speed estimation data, and acceleration estimation data in the human-body pose estimation data into an optimized pose estimation network to obtain human-body pose optimization data, wherein sample balancing processing is performed on the human-body pose estimation data when the human-body pose estimation data is input into the optimized pose estimation network; the optimized pose estimation network comprises a first branch layer, a second branch layer, and a third branch layer; the first branch layer, the second branch layer, and the third branch layer are branch layers parallel to each other; the first branch layer is configured to calculate position optimization data in the human-body pose optimization data; the second branch layer is configured to calculate speed optimization data in the human-body pose optimization data; the third branch layer is configured to calculate acceleration optimization data in the human-body pose optimization data; data output from the first branch layer, the second branch layer, and the third branch layer is respectively output by the fully connected layer and then enters a linear fusion layer for feature fusion, so as to obtain the human-body pose optimization data; and inputting the human-body pose estimation data into the optimized pose estimation network is expressed by the following formula:

$$\hat{G}=g(\hat{Y})$$

wherein it is satisfied that $\hat{G} \in R^{L \times C}$, wherein $\hat{G}$ represents an optimized and improved human-body pose estimation result, R represents a three-dimensional rotational Euler angle of a human-body key point, and L represents a quantity of input image frames; and it is satisfied that C=N×D, wherein N represents a quantity of defined human-body key points, D represents a quantity of output dimensions, in a three-dimensional human-body pose estimation issue, D=3, and $\hat{Y}$ represents an estimated value for a key-point Euler angle that is output by calculating a human-body pose estimation algorithm based on a basic smoothing network, wherein output of the branch layer of the optimized pose estimation network is expressed by the following formula:

$$\hat{Y}_{i,t}^{l+1} = \sigma\left(\sum_{t=O}^{T} \omega_\tau^l * \hat{Y}_{i,t}^l + b^l\right),$$

wherein l represents a first layer of the network; σ represents a non-linear activation function; $\omega_\tau^l$ and $b^l$ represent weight and bias learned at a $t^{th}$ frame, respectively; and T represents a sliding window, wherein the step of performing balancing processing on the human-body pose estimation data comprises:
  defining $p_{train}(x, y)$ as training distribution, wherein $p_{train}(y)$ represents a non-equilibrium training distribution, $p_{bal}(x, y)$ represents a balance test distribution, $p_{bal}(y)$ represents a uniform distribution, and relationships between $p_{train}(y|x)$, $p_{bal}(y|x)$, and $p_{train}(y)$ can be expressed by the following distribution data relationship formula:

$$p_{train}(y \mid x) = \frac{p_{bal}(y \mid x) \cdot p_{train}(y)}{\int_Y p_{bal}(y' \mid x) \cdot p_{train}(y') dy'};$$

predicting an estimated value for the three-dimensional rotational Euler angle of the human-body key point according to an expected expression formula, wherein the expected expression formula is:

$$p_{bal}(y|x;\theta)=N(y;y_{pred}, \sigma_{noise}^2 I),$$

wherein θ represents a parameter of the optimized pose estimation network for training, $y_{pred}$ represents the estimated value for the three-dimensional rotational Euler angle of the human-body key point, and $\sigma_{noise} I$ represents a variance matrix of a Gaussian distribution to which the estimated value for the three-dimensional rotational Euler angle conforms;
  calculating an equilibrium mean square error loss based on the distribution data relationship formula and an equilibrium mean square error loss formula, wherein the equilibrium mean square error loss is used for balancing the human-body pose estimation data, the equilibrium mean square error loss is determined by a maximum likelihood loss of a corresponding conditional probability after $p_{bal}(y|x; \theta)$ is converted into $p_{train}(y|x; \theta)$, and the equilibrium mean square error loss formula is:

$$L_{bal} = -\log p_{train}(y \mid x; \theta) = -\log \frac{p_{bal}(y \mid x; \theta) \cdot p_{train}(y)}{\int_Y p_{bal}(y' \mid x; \theta) \cdot p_{train}(y') dy'} \cong$$
$$-\log N(y; y_{pred}, \sigma_{noise}^2 I) + \log \int_Y N(y'; y_{pred}, \sigma_{noise}^2 I) \cdot p_{train}(y') dy';$$

the control module is configured to calculate loss functions of the position optimization data and the acceleration optimization data in the human-body pose optimization data; and
the control module is further configured to drive, based on the loss function, the optimized pose estimation network to update a network parameter to obtain an optimal driving model that is based on the optimized pose estimation network.

8. A digital person driving system, comprising a server that can communicate with a user equipment, wherein the server comprises an optimal driving model trained by using the method according to claim 1; and the server is configured to:

receive a driving video sent by the user equipment, wherein a driving frame image of the driving video comprises a single driving person image;

mark a human-body key point on the single driving person image based on a human-body key point definition model;

input the single driving person image marked with the human-body key point into a pose estimation network, to obtain human-body pose estimation data;

input the human-body pose estimation data into an optimal driving model, to obtain human-body pose optimization data;

send the human-body pose optimization data back to the user equipment to drive a digital person in the user equipment to carry out an action of a single driving person; or drive, based on the human-body pose optimization data, a digital person in the server to carry out an action of the single driving person, and send data of the digital person in the server back to the user equipment to be displayed in the user equipment.

* * * * *